United States Patent [19]
Reese, Sr.

[11] 3,751,988
[45] Aug. 14, 1973

[54] DIFFERENTIAL PRESSURE RESPONSIVE DEVICE

[75] Inventor: William M. Reese, Sr., Dallas, Tex.

[73] Assignee: Mary Catholeene Reese, Dallas, Tex.

[22] Filed: Mar. 30, 1971

[21] Appl. No.: 129,364

[52] U.S. Cl............... 92/37, 73/407 R, 92/38, 251/335 B
[51] Int. Cl............... F16j 3/00, G01l 7/06
[58] Field of Search............... 73/407 R, 393; 92/37, 10, 38, 45, 104, 90, 97; 251/335 B

[56] References Cited
UNITED STATES PATENTS

| 2,400,048 | 5/1946 | Jones | 92/38 |
|---|---|---|---|
| 3,050,085 | 8/1962 | Reese | 73/407 R |
| 2,989,084 | 6/1961 | Jones | 73/410 X |
| 3,126,744 | 3/1964 | Hermanns | 73/407 R |
| 2,146,100 | 2/1939 | Walch | 285/404 X |
| 1,831,856 | 11/1931 | Fullman | 285/404 |
| 3,262,317 | 7/1966 | Smith, Jr. | 73/407 R |
| 3,563,138 | 2/1971 | Symonds | 73/407 R X |

Primary Examiner—Richard C. Queisser
Assistant Examiner—Daniel M. Yasich
Attorney—Burns, Doane, Swecker & Mathis

[57] ABSTRACT

A differential pressure responsive device which uses two opposed bellows mounted on a center plate and exposed externally to differential pressures. Flow between the interiors of the bellows is provided through a center plate opening or passage controlled by valves that are connected with the free ends of the bellows through adjustable connections. Suitable means is provided for transmitting motion exteriorly of the housing of the meter through a torque shaft operatively connected with the tie connections between the bellows so as to be moved in response to fluctuations of the bellows. A range spring is connected with this shaft to control the range of the meter.

7 Claims, 4 Drawing Figures

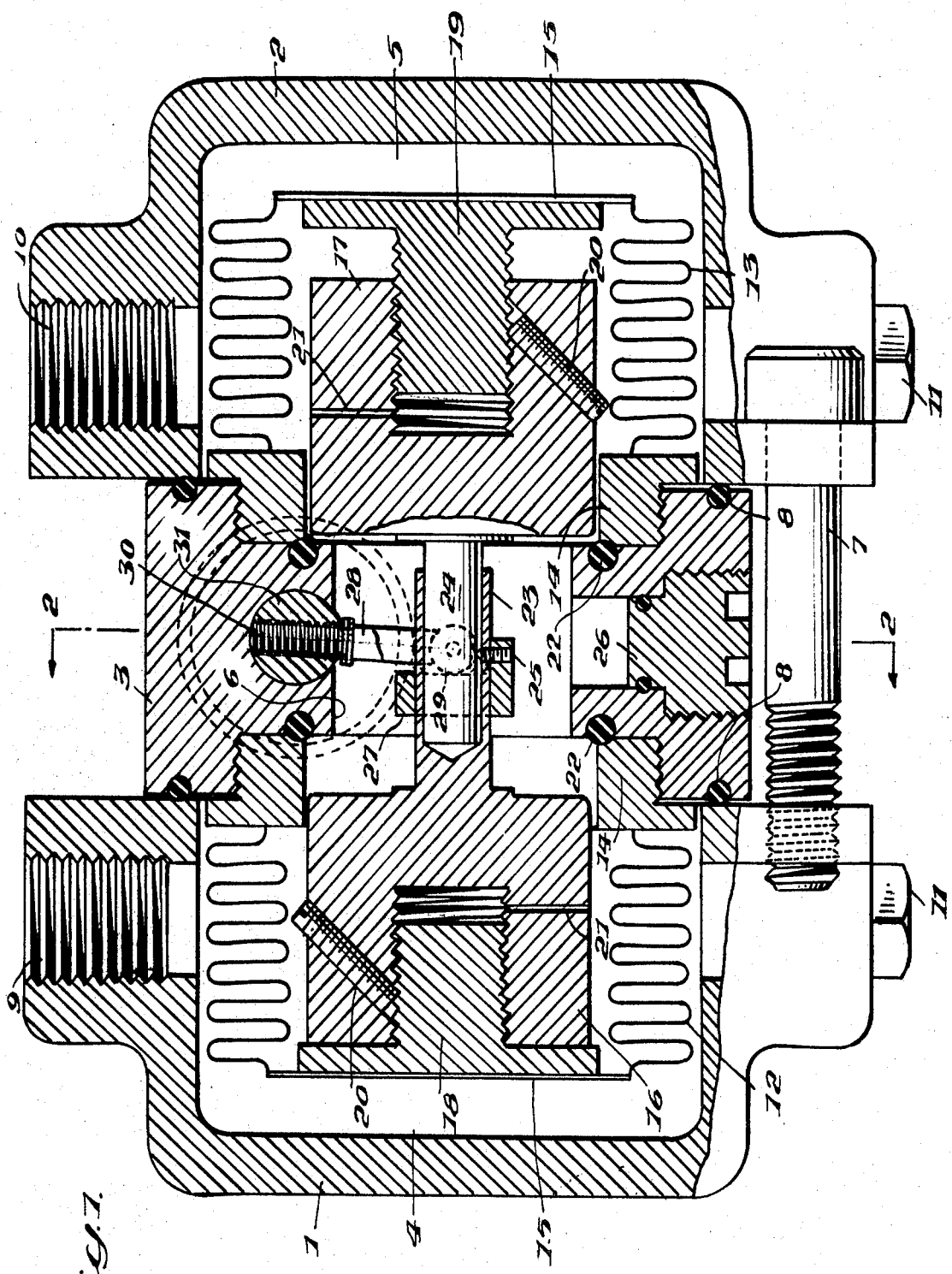

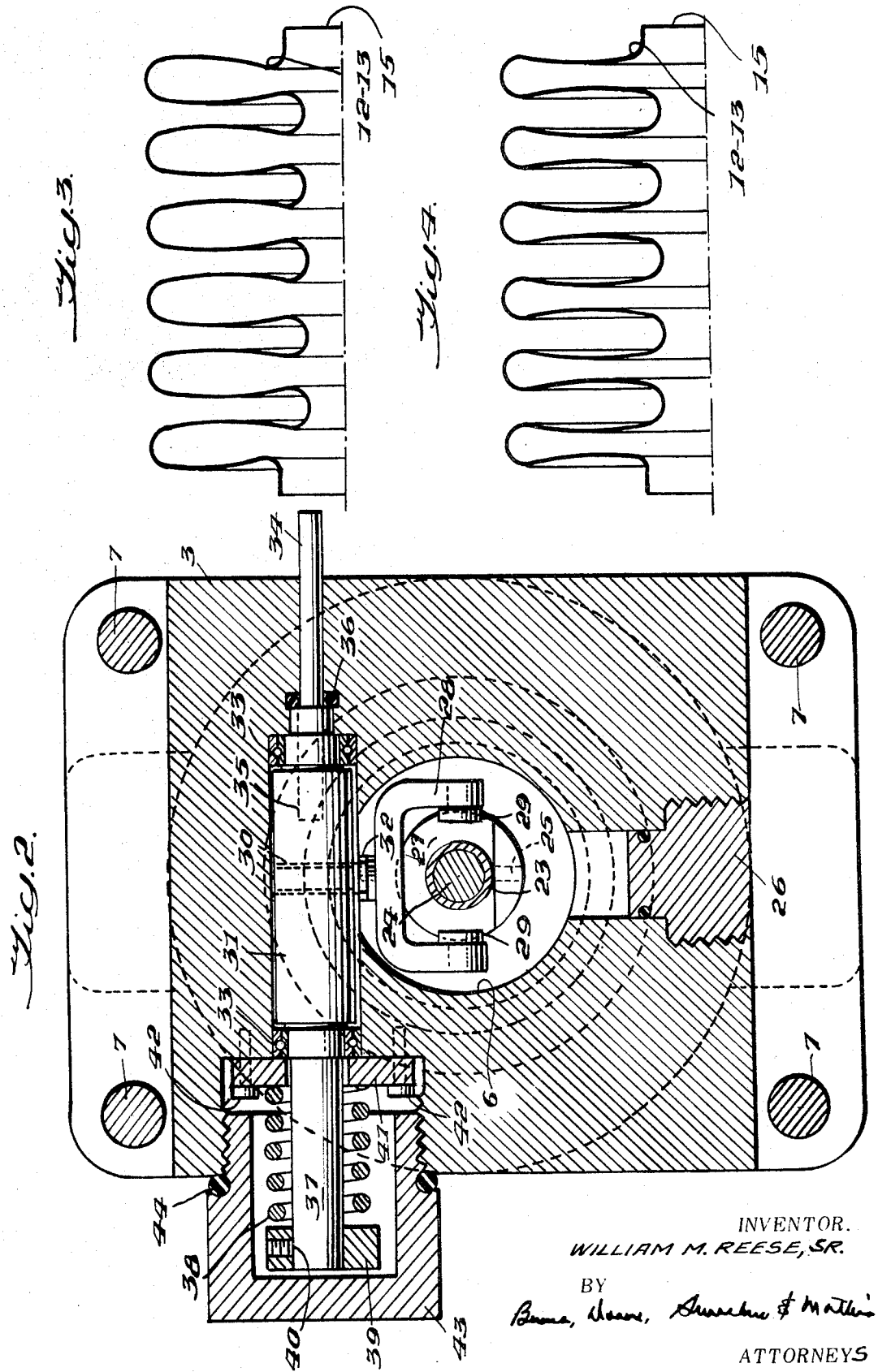

DIFFERENTIAL PRESSURE RESPONSIVE DEVICE

SUMMARY OF THE INVENTION

This invention relates to improvements in differential pressure responsive devices of the character used for measuring or indicating pressures in different environments such, for example, as the drop in pressure through an orifice plate in a flow line or between separate chambers having different pressures or for many other purposes.

It has been proposed heretofore to construct flow meters which use two opposed bellows mounted on a center plate and adapted for open communication through a passage in the center plate, which passage is controlled by valves connected with the bellows. The pressure to be measured are applied respectively to the exteriors of the two bellows and the bellows move in response thereto.

With such flow meters as have been provided and have been in use heretofore, it has been customary to provide the range springs connected directly with one of the bellows either inside or outside of the bellows so as to effect the desired expansion or contraction thereof as a result of the differential in pressures. The valve stem which connects the movable ends of the bellows has served to operate a shaft for transmitting the motion to an appropriate element for indicating or recording the differential condition at an exterior or remote point. This has required the disassembly of the meter for making changes in the range thereof because it has been necessary to open and remove the contents and often to disassemble the bellows themselves or at least one of them.

One object of the invention is to overcome the objections with flow meters as constructed heretofore and to simplify and improve the same.

Another object of the invention is to provide range spring means for the meter which is capable of replacement to vary the range of the instrument without the necessity for disassembling the meter or any substantial part thereof or affecting the operating parts.

A further object of the invention is to provide means operatively connected with the transmitting shaft for controlling the range of the meter and which can be adjusted or replaced to vary the range without substantial disassembly of the meter.

These objects may be accomplished according to one embodiment of the invention by providing a pair of bellows mounted at one end on a center plate in the housing and having the opposite ends of these bellows, which would be the free ends thereof, connected together in a rigid relation so as to move equally and not relative to each other. Provision is made for adjusting the initial setting of the bellows relative to each other. The transmitting shaft, which is operatively connected with the valve stem, will be rotated in response to back and forth movement of the valve stem due to fluctuations in the line or relative chambers.

A range spring is operatively connected with the transmitting shaft and is capable of being removed as an assembly, being enclosed within a cover or cap so as to permit adjustment or replacement of the range spring to vary the range of the instrument without disassembly of the housing or any substantial part thereof.

BRIEF DESCRIPTION OF DRAWINGS

This embodiment of the invention is illustrated in the accompanying drawings, in which:

FIG. 1 is a longitudinal section through a flow meter illustrating the present invention;

FIG. 2 is a cross section therethrough on the line 2—2 in FIG. 1;

FIG. 3 is a diagrammatic sectional view of a portion of one of the bellows showing the effect of high temperature thereon; and FIG. 4 is a similar view showing the effect of low temperature on the bellows.

DETAILED DESCRIPTION OF DRAWINGS

While the invention is adapted for many uses as a differential pressure responsive device for measuring, controlling or indicating pressure differentials, one embodiment of the invention is illustrated as a differential flow meter to measure or indicate the drop in pressure through an orifice plate in a flow line. A typical oil or gas flow line is provided at a suitable point with an orifice plate therein and the line is adapted for connection on opposite sides of the orifice plate with the flow meter, to the high and low pressure chambers in the latter.

In this embodiment of the flow meter, there are provided high and low pressure housings 1 and 2 arranged in axial alignment with each other on opposite sides of a center plate 3 which is interposed between the inner ends of the housings. These housings enclose high and low pressure chambers 4 and 5 that are connected together through a passageway 6 leading through the center of the center plate 3. Bolts 7 extend between the housings 1 and 2 and connect these together in a secure relation. Suitable sealing means is provided at 8 between the opposite sides of the center plate 3 and the adjacent ends of the housings 1 and 2. Such sealing means may be in the form of rubber O-rings.

The high and low pressure chambers 4 and 5 are adapted to be connected with the source of the respective pressure such, for example, as with the pipe line on opposite sides of the orifice plate therein. The housings 1 and 2 are shown as having pipe connections on opposite sides thereof, one set of which may be used as indicated at 9 and 10, respectively, while the second set, if not required for use, may be closed and sealed by plugs 11.

Mounted in the respective high and low pressure chambers 4 and 5 are high and low pressure responsive bellows 12 and 13, the inner ends of which are mounted on support rings 14 which are detachably mounted, in turn, in opposite sides of the center plate 3. These rings 14 may be screwed into sockets provided in the sides of the center plate for secure mounting of the bellows in the chambers. The outer ends of the respective bellows are closed and sealed as by an end plate 15.

The high and lower pressure bellows 12 and 13 extend about plug members 16 and 17, respectively, each of which has a cap member 18 and 19, a portion of which is adjustable or threaded into a socket in the outer end of the plug member 16–17. The cap member 18 and 19 are fixed to the bellows end plates 15, as by being welded thereto. The cap and plug members are held in adjusted positions with respect to each other by a set screw 20 threaded through a side of each plug member and into locking engagement with the telescoped portion of the cap member. Vent holes 21 extend radially out through the plug members for drainage of any fluids that may be trapped between the plug members and the cap members.

The plug members 16 and 17 form valves to control the flow through the passageway 6 between the high and low pressure bellows 12 and 13. As suitable valve seats therefor, I have provided rubber O-rings 22 in the lateral faces of the center plate 3 in positions for engagement by the inner ends of the plug members 16 and 17 which will be seated alternately as the respective bellows expand and contract. In this way the flow back and forth between the bellows will be regulated and one or the other of the valves may be seated to prevent injury to the bellows due to excessive pressure in the line on either side of the orifice plate.

The plug members 16 and 17 are connected rigidly together, but may be adjusted with respect to each other. This assembly forms a rigid connection between the outer free ends of the bellows but is movable back and forth in response to differentials in pressure. This rigid connection is through a valve stem illustrated as a sleeve 23 on the plug member 16 telescoped with rod 24 on the plug member 17.

The sleeve and rod member are rigidly connected together as by means of a screw 25 which engages through the sleeve 23 to a side of the rod member. The screw 25 may be adjusted through a lateral opening in the center plate, normally closed by a plug 26, which may be removed for this purpose. The bellows can be filled through this same opening upon removal of the plug 26, and will be sealed when the plug is replaced.

The screw 25 is carried by a ring 27 slidably mounted on the sleeve 23 and is adjustably held in a fixed position with respect thereto by the screw 25. A yoke 28 straddles the valve stem, as shown in FIG. 2, and has depending arms on opposite sides of the valve stem, carrying follower bearings 29 on the free ends thereof, which follower bearings 29 engage one lateral face of the ring 27. Thus, the yoke 28 is moved axially of the valve stem in response to movement of the latter in one direction.

The yoke 28 is carried by a pin 30 threaded or otherwise detachably connected with a shaft 31, which is the shaft that transmits motion to the exterior of the meter. The pin 30 is threaded diametrically through the center of the shaft 31 and may be secured rigidly thereto as by a lock nut 32.

The shaft 31 extends transversely through the center plate 3, as will be made clear in FIG. 2, and is mounted at opposite end portions thereof in suitable anti-friction bearings shown at 33. One end of the shaft 31 is connected with suitable means for indicating or recording the relative movements, for which purpose I have shown a transmitting shaft 34 connected thereto in rigid relation to rotate with the shaft 31.

In the embodiment shown, the shaft 34 is of smaller diameter than the shaft 31 and is telescoped into the adjacent end of the latter, as indicated at 35. The opening around the shaft 34 may be provided with suitable sealing means, such as a rubber O-ring 36. The shafts 31 and 34 are rigidly connected together, so that rotation of the shaft 31 will cause uniform rotation of the shaft 34.

At the opposite end of the shaft 31 and preferably formed in one integral piece therewith is an end portion 37 which is adapted to receive a range spring therearound rigidly connected with the shaft end portion. The range spring is indicated at 38, in the form of a coil spring, fixed at one end to a boss 39 on the shaft end portion 37 as by a set screw 40.

The opposite end of the range spring 38 is fixed to a disc 41 which surrounds the shaft end portion 37. This disc 41 is detachably mounted on the center plate 3 by a plurality of cap screws 42. A cap 43 encloses the range spring 38 and the shaft end portion 37, being threaded into a side of the center plate 3 and sealed with respect thereto by a suitable gasket 44.

The bellows 12 and 13 and the passageway 6 therebetween are filled with an incompressible fluid which is transferred back and forth therebetween in response to differential of pressures in the chambers 4 and 5. Excess expansion or contraction of the bellows is controlled by one or the other of the plug members 16 or 17 which form valves for closing the passageway 6 under extreme conditions.

Under variations in temperature, the bellows will expand or contract in the convolutions thereof axially of the bellows, as indicated in FIGS. 3 and 4, the high temperature condition being shown in FIG. 3 and the low temperature condition being shown in FIG. 4. This method of compensating for changes in temperature is accomplished due to the balanced design of the flow meter since both high and low pressure bellows have the same spring rate or load for all ranges. By securing the two bellows together at their free ends with equal spring load for all ranges causes the function of the convolutions in response to variations in temperature, as illustrated in FIGS. 3 and 4. Neither side of the meter has the disadvantage of being unbalanced by the addition of one or more range springs either internally or externally connected thereto. This method of temperature compensation has been found effective through the range of −40° to +175°F.

The range of the meter may be changed readily by removing the cap 43, disconnecting the screw 40 and the screws 42. Then the ring 39 and disc 41, together with the range spring 38, can be slipped off the end portion 37 of the shaft and replaced by another of appropriate size. Upon reconnecting of the corresponding screws and replacing the cap 43, the meter is ready for operation. It is not necessary to disconnect or remove one of the housings or make other major changes in the meter in order to change the range thereof.

The construction herein described as an embodiment of this invention has solved many problems in flow meters of this type:

1. The temperature compensation effect is obtained in the bellows themselves.
2. The same balanced meter is provided for all ranges.
3. A simple range spring assembly always maintains balance and is used for ready replacement when needed.
4. The bellows are used for a hydraulic purpose and always balance the load across them, as well as having provisions for temperature compensation.
5. Over-range valves are simple and foolproof and always seat effectively against seats that are maintained securely.
6. The high and low sides of the meter can be reversed or slip range provided on the assembly.
7. The range spring shaft rotates on bearings that carry the load with ease and without requiring a spare housing or sleeve therefor. The drive arm is secured to the range spring shaft which carries the total load of the meter.

8. A single seal plug is used closing the filling opening, sealing the meter as well as securing the locking of the two bellows together.

The construction is a material improvement in its simplicity, each of manufacture, rugged, durable, requiring no separate temperature compensator, balanced bellows at all times, ease of change of range of the meter and uniformity of operation of the range spring shaft which takes the full load, relieving the bellows thereof.

While the invention has been illustrated and described in one embodiment, it is recognized that variations and changes may be made therein without departing from the invention set forth in the claims.

I claim:

1. In a differential pressure responsive device two housings on opposed sides of a center plate and having pressure chambers therein open communication with each other through an opening in the center plate, bellows mounted in the respective chambers and enclosing a liquid, said bellows having movable end portions, valve means connecting the movable end portions together through said opening, said valve means including portions slidably telescoped with each other, means for locking said portions in secure connection, a ring sleeved over the telescoped portions and having the locking means carried thereby, and output means including means rotatably mounted transversely through the center plate said output means transmitting motion of the valve means to the outside of the housing and said output rotatable means connected to means having a follower bearing against a side of the ring and operated by movement of the telescoped portions.

2. In a differential pressure responsive device according to claim 1, including spring means connected with said motion transmitting output means and acting thereon to move the movable ends of the bellows in one direction.

3. In a differential pressure responsive device two housings on opposed sides of a center plate and, having pressure chambers therein in open communication with each other through an opening in the center plate, bellows mounted in the respective chambers and enclosing a liquid, said bellows having movable end portions, valve means including rod means connecting the movable end portions together, means connected with the valve means for transmitting motion of the valve means to the outside of the housings, the motion transmitting means including a shaft mounted transversely in the housing for rotary movement and extending through said plate, means operatively connecting said shaft with the valve means for turning the shaft upon axial movement of the valve means, a transmitting shaft connected to said valve rod means and to said first mentioned shaft to rotate therewith, and a range spring connected with the opposite end of the first mentioned shaft to control rotary movement of the shafts.

4. In a differential pressure responsive device according to claim 3 wherein the motion transmitting means includes a shaft mounted in the housing and having a projecting end portion, a range spring sleeved over said projecting end portion and having one end thereof fixed to the shaft and the opposite end fixed to the housing for controlling the rotary motion of the shaft.

5. In a differential pressure responsive device, according to claim 6, each of the bellows having corrugated peripheral portions with walls of the corrugations disposed transversely of the axes of the bellows and movable laterally in directions axially of the bellows in response to variations in temperature.

6. In a differential pressure responsive device, two housings on opposed sides of a center plate and having pressure chambers therein in open communication with each other through an opening in the center plate bellows mounted in the respective chambers and enclosing a liquid, said bellows having movable end portions, valve means including rod means connecting the movable end portions together, means connected with the valve means for transmitting motion of the valve means to the outside of housings, the motion transmitting means connected to a shaft rotatably mounted transversely in the housing and extending through the center plate, said shaft having a projecting end portion externally of the housings, a disc sleeved over the shaft end portion, means detachably connecting the disc with the housing for separation and removal therefrom, and a coiled spring sleeved over the shaft end portion and having one end anchored to the shaft and the other end anchored to the disc, said disc and spring being removable from the shaft for replacement of the spring.

7. In a differential pressure responsive device according to claim 6, said spring and disc being slidably removable from the end portion of the shaft for replacement, and a cap detachably mounted on the housing over the projecting end portion of the shaft.

* * * * *